United States Patent [19]

Chundury et al.

[11] Patent Number: 5,116,540
[45] Date of Patent: May 26, 1992

[54] FREE-RADICAL MODIFIED CARBON BLACK FILLED POLYPROPYLENES

[75] Inventors: Deenadayalu Chundury, North Royalton, Ohio; Daniel L. Davidson, Newburgh, Ind.; Berdine L. Leonard, Macedonia; Anthony S. Scheibelhoffer, Norton, both of Ohio

[73] Assignee: Ferro Corporation, Cleveland, Ohio

[21] Appl. No.: 318,386

[22] Filed: Mar. 3, 1989

[51] Int. Cl.⁵ .............................. H01B 1/06
[52] U.S. Cl. ...................... 252/511; 252/500; 252/510
[58] Field of Search .......... 252/500, 510, 511; 524/495, 496; 525/387; 264/331.11, 331.15, 347

[56] References Cited

U.S. PATENT DOCUMENTS

| | | |
|---|---|---|
| 3,953,655 | 4/1976 | Steinkamp et al. |
| 4,395,362 | 7/1983 | Satoh et al. .......... 252/511 |
| 4,451,589 | 5/1984 | Morman et al. |
| 4,717,505 | 1/1988 | Delphin et al. |
| 4,731,199 | 3/1988 | Matsuo et al. ......... 252/511 |
| 4,734,450 | 3/1988 | Kawai et al. |

Primary Examiner—Josephine Barr
Attorney, Agent, or Firm—Daniel J. Hudak Co.

[57] ABSTRACT

Peroxide-provided free-radical molecular weight distribution narrowing of polypropylenes in the compounding stage of making conductive polypropylenes yields carbon black filled polypropylenes with improved rheological properties, surface conductivity, appearance, and surface characteristics with mechanical and physical properties similar to prior conductive polypropylenes.

8 Claims, 1 Drawing Sheet

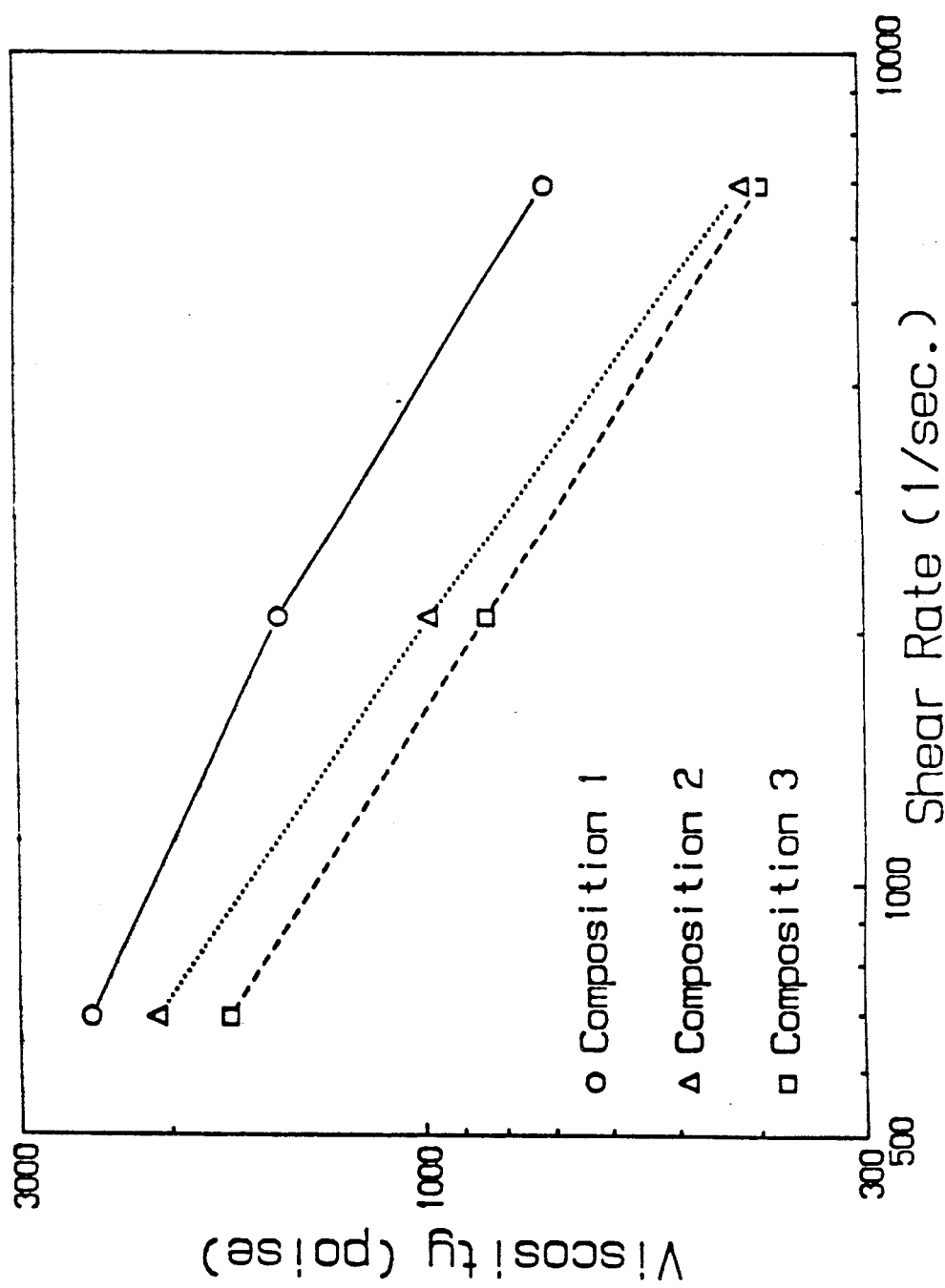

FREE-RADICAL MODIFIED CARBON BLACK FILLED POLYPROPYLENES

BACKGROUND OF THE INVENTION

1. Field of the Invention

This invention relates to conductive polymeric compositions and, more particularly, to in situ free-radical modified-carbon black filled polypropylenes having a narrowed molecular weight distribution and a lowered viscosity.

2. Description of the Related Art

Processing properties of polyolefins have been improved by techniques of narrowing their molecular weight distributions. U.K. Patent No. 1,042,178 describes processes of such narrowing wherein polyolefins are degraded at elevated temperatures by high shear gradients or by heat treatment in the presence of oxygen. U.S. Pat. No. 4,451,589 describes another such process wherein polymers are chemically degraded by free-radical scission, preferably with a peroxide, to yield a low weight average molecular weight polymer exhibiting a low viscosity. The lowered viscosity is a highly desirable property in certain polymer processes, especially the injection molding of polypropylene. Commercially available polypropylene has a molecular weight ranging upward to 1,000,000 with a molecular weight distribution of 6 to 12. Producers of polypropylene products prefer molecular weights and molecular weight distributions according to the end application. For instance, in the high speed spinning and fiber forming of polypropylene, a molecular weight of about 160,000 with a distribution of 2.5 to 4.5 is preferred, whereas in injection molding a molecular weight in the range of 150,000 to 400,000 with a molecular weight distribution of 3.5 is preferable.

U.S. Pat. No. 3,953,655 teaches a process of producing free-radical modified polyolefins by injecting peroxide into an extruder under specified conditions.

In general, the lowering of average molecular weight by peroxide treatment of polypropylene homopolymer or copolymer gives rise to decreased melt viscosity.

Techniques of causing thermoplastic materials to exhibit electrical conductivity by the addition of conductive materials such as carbon black and graphite are well known.

For instance, U.S. Pat. No. 4,717,505 teaches electrically conductive mixture of thermoplastic resins of propylene and ethylene copolymer containing conductive carbon in both carbon black and fiber form. The fibrous carbon is taught as improving the conductivity over materials containing only particulates, as well as providing a material with sufficient fluidity for injection molding of thin parts. The carbon comprises 33 to 60% of the weight of the copolymer-carbon mixture.

For certain applications, such as for use in molded articles to be surface painted rather than mixed with colorant during compounding, the incorporation of large amounts of carbon black has been found to adversely affect the paintability of the finished article. U.S. Pat. No. 4,734,450 teaches that the addition of smaller amounts of carbon, in the range of less than about 1%, to a polyolefin copolymer in combination with an inorganic filler such as talc, calcium carbonate, or barium sulfate yields a polypropylene based resin useful for making molded articles with improved surface paintability over such resins containing large amounts of carbon black alone.

Carbon black filled polypropylenes have been used for static dissipative applications which require surface resistivities in the range of $10^1$–$10^8$ ohms per square. At the typical filler loadings necessary to achieve this level of conductivity, the melt viscosity of the carbon black-polypropylene mixture is significantly higher than that of the base polypropylene resin. This causes the usual extrusion and molding problems associated with high viscosity.

SUMMARY OF THE INVENTION

It has been discovered that free-radical scission in the compounding stage of conductive polypropylenes yields carbon black filled polypropylenes with a lower viscosity, that is, a higher melt flow index, than prior art conductive polypropylenes. The conductive polypropylenes of the present invention have a narrow molecular weight distribution and improved rheological properties, surface and volume (bulk) conductivity, gloss, appearance, and surface characteristics. When molded into articles, the conductive polypropylene of the present invention shows little or no loss in mechanical or physical properties as compared to the prior art conductive polypropylene.

Accordingly, the invention provides a method of making conductive polypropylene comprising the step of compounding polypropylene and carbon black in the presence of a free-radical generator. The compounding may be carried out by mixing together the polypropylene, the free-radical generator and the carbon black, and then introducing the mixture into a compounder. The compounding may also be carried out by mixing polypropylene and a free-radical generator in a compounder until fluxed, and thereafter adding carbon black.

As used in the specification and the claims, the term "polypropylene" refers to all types of polypropylenes useful in the invention and includes polypropylene resins, polypropylene copolymers, polypropylene homopolymers, polypropylene blends, impact modified polypropylene, and polypropylene compounds containing mineral fillers, organic fillers, pigments, and the like. Additionally, higher α-olefins are contemplated as equivalent to the disclosed polypropylenes.

The free-radical generator is a preferably a peroxide which is present in an amount effective to narrow the molecular weight distribution of the polypropylene. The peroxide may be present in an amount of up to about 5% by weight of the polypropylene. An amount of polybutylene effective to enhance the resiliency of the conductive polypropylene may be added during compounding.

The invention further provides a method of enhancing the moldability of conductive polypropylenes comprising the step of treating polypropylene with an amount of peroxide effective to narrow the molecular weight distribution of the polypropylene. The treatment of the polypropylene may be carried out in the presence of conductive carbon or conductive carbon may be added after the polypropylene is contracted with the peroxide. The conductive carbon may be in the form of fibers or spheres, and is present in an amount effective to render the polypropylene conductive, preferably about 20 to 25% by weight.

The invention additionally provides for a conductive polypropylene comprising free-radical generator treated polypropylene and conductive carbon. The conductive polypropylene comprises about 50 to 90%, preferably 70 to 80%, free-radical generator treated polypropylene and about 10 to 50%, preferably, 20 to 30% conductive carbon. An amount of polybutylene or polybutene effective to enhance the resiliency of the conductive polypropylene may be added, preferably in an amount of about 2 to 10% by weight of the polypropylene. The conductive carbon may be in the form of spheres or fibers. The free-radical generator treated polypropylene may comprise up to about 5% by weight peroxide, preferably 1 to 2%.

Still other features and advantages and a full understanding of the invention will become apparent to those skilled in the art from the following detailed description of the invention and the examples contained therein.

BRIEF DESCRIPTION OF THE DRAWING

FIG. 1 is a graph showing viscosity versus shear rate for three compositions compounded according to Example I; compositions 2 and 3 were compounded according to the methods of the present invention.

DETAILED DESCRIPTION OF THE INVENTION

As used in the following examples, "melt index" refers to ASTM test D-1238, melt flow index is reported in g/10 min. under condition L; "flexural strength/flexural modulus," ASTM test D-790, both are reported in psi; "Izod impact," ASTM test D-256, both notched and unnotched Izod impact are reported in ft. lb./in.; "Gardner Impact," ASTM test D-3029, Gardner Impact is reported in in.lbs.; "spiral flow," ASTM test D-3123, spiral flow is reported in inches; and "surface resistivity," ASTM test D-257, surface resistivity is reported in ohm/square. All proportions of ingredients are given in weight percent; temperatures are expressed in degrees Fahrenheit.

Melt index, customarily used in characterizing polyolefins, is not always a reliable measure of the processability or moldability of a resin. Melt index describes the flow behavior of a resin at a specified temperature and under a specified pressure. Typically, these conditions represent low shear conditions, less than 100 sec$^{-1}$.

Injection molding is a high shear process, with shear rates typically between 1,000 and 10,000 sec$^{-1}$. Thus, melt index values do not always present a realistic picture of how easy or difficult a particular material is to mold.

Spiral flow testing in the injection molder measures the distance a material flows in a mold. Spiral flow can be used to characterize a material's moldability; higher spiral flow values represent higher ease of molding.

EXAMPLE I

The physical properties of three conductive (static-dissipative) compounds containing polypropylene and carbon black were evaluated to demonstrate the properties' dependence on in situ free-radical initiators. The compounds were prepared on a Stuart Bolling #12 internal mixer at a processing temperature of 365° F. NPP8502 polypropylene having a melt flow index (hereinafter MFI) =4, is a commercially available polypropylene copolymer available from the Quantum Chemical Corporation, USI Division, Cincinnati, Ohio. CR-10 peroxide concentrate (CR-10 is a trade name for a peroxide concentrate available from Polyvel, Inc., Hammonton, N.J.) contains 10% Lupersol 101 [2,5-dimethyl-2,5-bis-[t-butylperoxyl]hexane] in a proprietary polymer carrier. NPP8502 and CR-10 were combined in the proportions given in Table I and were mixed at 80 rpm until fluxed. After fluxing, carbon black was incorporated into the melt and mixed for one minute and thirty seconds. The carbon black was Vulcan XC-72, available from Cabot Corporation, Billerica, Mass. The resultant 480 pound batch was discharged from the mixer to a melt pump extruder, water cooled, and pelletized using an underwater pelletizer. Test specimens were injection molded in a 40 ton Newbury reciprocating screw molder using a stock temperature of 450°. The physical properties and rheological data for the materials are shown in Table I and FIG. 1.

In addition to the significantly enhanced flow properties and ease of injection molding measured by melt index, rheology and spiral flow, excellent surface characteristics and absence of molding "chatter marks" were seen in the samples compounded with an in situ free-radical generator. Surface resistivity of in situ free-radical compounded conductive compounds either improved or remained unchanged compared to the control material.

TABLE I

|  | 1 | 2 | 3 |
|---|---|---|---|
| COMPOSITION: |  |  |  |
| polypropylene | 77.00 | 76.23 | 75.46 |
| carbon black | 23.00 | 23.00 | 23.00 |
| peroxide concentrate | — | 00.77 | 1.54 |
| PROPERTIES: |  |  |  |
| melt index | 0.30 | 0.85 | 3.30 |
| flexural strength | 5500 | 5100 | 4740 |
| tangent flexural mod. ($\times 10^{-3}$) | 196 | 179 | 164 |
| unnotched Izod | no break | no break | no break |
| Gardner Impact | 142 | 145 | 131 |
| surface resistivity | 90 | 60 | 80 |
| spiral flow | 12.6 | 15.9 | 20.5 |

Column 1 reports the physical properties of a conductive composition prepared without peroxide concentrate. Columns 2 and 3 report the properties of compositions prepared with 1 and 2 wt % CR-10 peroxide concentrate based on polypropylene. The 2 wt % material exhibits a melt index one order of magnitude greater than the conductive material not prepared in the presence of the peroxide concentrate.

EXAMPLE II

Carbon black compositions with and without free-radical initiators, utilizing very high flow polypropylene (homopolymer or copolymer) resins, were prepared on a laboratory scale using a Farrel midget Banbury mixer. The batch size was about 300 grams. Polypropylene (either SB 642 (MFI=20) from Himont USA, Inc., Wilmington, Del., or PP 1154 (MFI=35) from Exxon Chemical America, Houston, Tex.) was mixed with CR-10 (as in Example I) in the proportions shown in Table II until fluxed. Then the indicated amount of carbon black (Vulcan XC-72 as in Example I) was added. Process temperatures of about 270°-300° were used, depending upon the melting characteristics of the particular resin. Injection molded samples, prepared as in Example I, had properties as shown in Table II. In addition to the properties shown, the molded specimens of compounds manufactured in the presence of peroxide exhibited surface appearance characteristics superior to the control materials.

TABLE II

| COMPOSITION | 1 | 2 | 3 | 4 | 5 |
|---|---|---|---|---|---|
| SB 642 | 77.00 | 76.23 | 75.49 | — | — |
| PP1154 | — | — | — | 77.00 | 75.49 |
| carbon black | 23.00 | 23.00 | 23.00 | 23.00 | 23.00 |
| peroxide conc. | — | 0.77 | 1.51 | — | 1.51 |
| PROPERTIES |  |  |  |  |  |
| melt index* | 32.8 | 54.6 | 72.4 | 47.2 | 130.0 |
| flexural strength | 5385 | 5248 | 5234 | 6500 | 6120 |
| tangent flexural mod. ($\times 10^{-3}$) | 218 | 176 | 194 | 237 | 231 |
| unnotched Izod | no break | no break | no break | 3.2 | 1.9 |
| Gardner Impact | 295 | 292 | 278 | — | — |
| surface resistivity | 40 | 70 | 70 | 150 | 170 |
| spiral flow | 13.8 | 14.4 | 16.6 | — | — |

*melt index, 230° C., 10 kg loading

Conductive compounds prepared with SB 642 (MFI=20) exhibited increasing melt indices with increasing concentration of CR-10 peroxide concentrate. As shown in column 3, the 2% (wt./wt. peroxide/polypropylene) material had a three and one-half fold increase in melt index.

Conductive compounds prepared with PP1154, having an initial melt flow of 35, showed an almost four-fold increase in melt flow after processing with 2 wt. % peroxide concentrate.

EXAMPLE III

Polypropylenes were compounded with a conductive carbon black and additionally with polybutylene resin in the presence of an in situ free-radical generator (peroxide) under the conditions specified in Example I; the polypropylene was NPP 8502 (MFI=4), the carbon black was XC-72, and the peroxide was CR-10. The polybutylene was Polybutylene 8640, available from Shell Chemical Company, Houston, Tex. The polypropylene, the peroxide, and the polybutylene were mixed until fluxed, and then the carbon black was added. Properties of the resultant materials were as shown in Table III.

TABLE III

|  | 1 | 2 |
|---|---|---|
| COMPOSITION |  |  |
| polypropylene | 74.69 | 72.69 |
| carbon black | 23.00 | 23.00 |
| peroxide concentrate | 2.31 | 2.31 |
| polybutylene | — | 2.00 |
| PROPERTIES |  |  |
| melt index | 7.5 | 9.5 |
| flexural strength | 5000 | 5000 |
| tangent flexural mod. ($\times 10^{-3}$) | 170 | 170 |
| unnotched Izod | 3.0 | 3.0 |
| Gardner Impact | 100 | 120 |
| surface resistivity | 90 | 110 |

Replacement of a small amount of polypropylene with polybutylene resulted in a material exhibiting more resiliency, as indicated by increase in the Gardner Impact value.

EXAMPLE IV

Conductive carbon black containing polypropylene compounds prepared on a laboratory Leistritz twin screw counter-rotating extruder (34 mm) exhibited similar enhancement of properties for in situ free-radical generated products to the compounds prepared in Examples I to III. Materials containing the ingredients in the proportions listed in Table IV were prepared using mild mixing configuration screws, stock temperature of 450°, and screw speeds of 100 rpm. The polypropylene was SB 786 (MFI=8), available from Himont USA, Inc., Wilmington, Del. The carbon black was Vulcan XC-72, and the peroxide concentrate was CR-10. The ingredients were mixed together and hopper fed into the extruder. The cooled extruded material was cut into pellets; injection molding was done as in Example I.

Physical properties as shown in Table IV were obtained. Surface appearance characteristics of the composition containing the peroxide were significantly better than the compound without the free-radical initiator.

TABLE IV

|  | 1 | 2 |
|---|---|---|
| COMPOSITION: |  |  |
| polypropylene | 77.00 | 75.46 |
| carbon black | 23.00 | 23.00 |
| peroxide concentrate | — | 1.54 |
| PROPERTIES: |  |  |
| melt index | 0.5 | 1.6 |
| flexural strength | 6570 | 6050 |
| tangent flexural mod. ($\times 10^{-3}$) | 229 | 232 |
| notched Izod | 5.3 | 2.5 |
| Gardner Impact | 166 | 125 |
| surface resistivity | 25 | 35 |

In comparison to the method of preparation in Examples I-III wherein polypropylene was mixed with peroxide concentrate until fluxed before the addition of carbon black, the method of preparation in Example V illustrated that all the components may be mixed together before being delivered to an extruder.

EXAMPLE V

A polypropylene and carbon black composition with a free-radical initiator was compounded in a one-step in situ process in a Stewart Bolling OOM internal melt mixer. Polypropylene NPP 8755 (MFI=5) from Quantum Chemical Corporation, USI Division, Cincinnati, Ohio) and CR-10 peroxide concentrate were mixed until fluxed. Then the indicated amount of carbon black, Vulcan XC-72, was added and mixed until incorporated. Batch size was 1000 grams.

Injection molded samples, prepared as in Example I, had properties shown in Table V.

Additionally, an identical composition with free-radical initiator was prepared on the same equipment in a two-step process where the polypropylene and free-radical generator (peroxide) were mixed until fluxed. The resulting resin was pelletized and then reintroduced into the equipment. When the resin was fluxed, the indicated amount of carbon black was added and mixed until incorporated. Injection molded samples, prepared as in Example 1, had the properties shown in Table V.

Significantly enhanced flow, as measured by melt index, was seen in the sample prepared by use of an in situ free-radical generator.

TABLE V

|  | 1 | 2 |
|---|---|---|
| COMPOSITION: |  |  |
| polypropylene | 74.62 | 74.62 |
| carbon black | 23.00 | 23.00 |
| peroxide concentrate | 2.38 | 2.38 |
| PROPERTIES: |  |  |
| melt index | 6.4 | 0.7 |

TABLE V-continued

|  | 1 | 2 |
|---|---|---|
| Gardner Impact | 140 | 184 |
| surface resistivity | 380 | 210 |

Example V illustrated that the important feature of the invention was the in situ compounding of the ingredients, that is, the addition of carbon black to either freshly fluxed polypropylene already in a compounder or mixed together with the polypropylene and peroxide concentrate before placement in the compounder.

EXAMPLE VI

Polypropylene resin was compounded with a conductive carbon black and a polymer additive, either polybutene or a nucleating agent, in the presence of am in situ free-radical generator (peroxide) as in Example V. The physical properties of the resultant conductive materials are shown on Table VI. It was observed that addition of small quantities of polybutene to the conductive polypropylene formulations resulted in improvements in both melt flow and Gardner impact resistance. The same was observed for the free-radical modified, nucleated polypropylene compound, reported in column 4, below. The molded specimens had excellent surface characteristics.

TABLE VI

|  | 1 | 2 | 3 | 4 |
|---|---|---|---|---|
| COMPOSITION |  |  |  |  |
| Exxon PD 7131 pp copolymer | 75.46 | 70.46 | 70.46 | 75.11 |
| Milliken Millad 3905 nucleating agent (dibenzylidene sorbitol) | — | — | — | 0.25 |
| polybutene Amoco Grade H100 | — | 5.00 | — | — |
| polybutene Amoco Grade E-16 | — | — | 5.00 | — |
| peroxide conc. | 1.51 | 1.54 | 1.54 | 1.54 |
| carbon black | 23.00 | 23.00 | 23.00 | 23.00 |
| PROPERTIES |  |  |  |  |
| melt flow | 1.8 | 4.8 | 4.7 | 1.7 |
| Gardner Impact | 85 | 186 | 224 | 171 |

Many modifications and variations of the invention will be apparent to those skilled in the art in light of the foregoing detailed disclosure. Therefore, it is to be understood that, within the scope of the appended claims, the invention can be practiced otherwise than as specifically described.

We claim:

1. A conductive polypropylene, comprising:
   from about 50 to about 90 percent by weight of polypropylene and from about 10 to about 50 percent of conductive carbon which may be in the form of one or more of fibers and spheres, said polypropylene and said carbon being in situ melt processed in the presence of an effective amount of a peroxide to provide a narrowed molecular weight distribution of said polypropylene, said effective amount being more than 0 up to about 5 percent by weight.

2. The polypropylene of claim 1 comprising about 70% free-radical generator treated polypropylene and about 30% conductive carbon.

3. The polypropylene of claim 1 further comprising an amount of polybutylene or polybutene effective to enhance the resiliency thereof.

4. The polypropylene of claim 1 wherein the conductive carbon is in the form of spheres or fibers.

5. The polypropylene of claim 1 wherein the polypropylene is present in an amount of about 75 to 77% and the conductive carbon is present in an amount of about 23 to 25%.

6. The polypropylene of claim 5 comprising a nucleating agent.

7. A conductive polypropylene as set forth in claim 1, wherein said melt processing is carried out by forming a mixture of the polypropylene, the free-radical generator, and the carbon black and then introducing the mixture into a compounder.

8. A conductive polypropylene as set forth in claim 1, wherein said melt processing is carried-out by mixing the polypropylene and the free-radical generator in a compounder until fluxed and thereafter adding carbon black.

* * * * *